United States Patent [19]

Inoue

[11] 4,125,444
[45] Nov. 14, 1978

[54] ELECTROCHEMICAL POLISHING METHOD

[75] Inventor: Kiyoshi Inoue, Tokyo, Japan

[73] Assignee: Inoue-Japax Research Incorporated, Yokohama, Japan

[21] Appl. No.: 860,243

[22] Filed: Dec. 13, 1977

[30] Foreign Application Priority Data

Dec. 14, 1976 [JP] Japan ............................... 51-150051
Jun. 10, 1977 [JP] Japan ................................ 52-69129
Sep. 21, 1977 [JP] Japan .............................. 52-113273

[51] Int. Cl.² ............................ C25F 3/24; C25F 3/16
[52] U.S. Cl. ......................... 204/129.43; 204/129.46; 204/129.6; 204/129.7; 204/DIG. 9; 204/271
[58] Field of Search ........... 204/129.43, 129.6, 129.46, 204/DIG.9, 129.7, 271

[56] References Cited

U.S. PATENT DOCUMENTS

| 3,297,555 | 1/1967 | Rerat ................................. 204/129.43 |
| 3,520,788 | 7/1970 | Paehr ................................ 204/129.43 |
| 3,649,488 | 3/1972 | Pitetti et al. ................ 204/129.43 X |
| 3,663,387 | 5/1972 | Harrison ..................... 204/129.43 X |
| 3,689,388 | 9/1972 | Diepers et al. .................. 204/129.43 |
| 3,798,141 | 3/1974 | Yahalom ......................... 204/129.43 |

FOREIGN PATENT DOCUMENTS 229,155  7/1969  U.S.S.R. .............................. 204/129.43

Primary Examiner—John H. Mack
Assistant Examiner—D. R. Valentine
Attorney, Agent, or Firm—Karl F. Ross

[57] ABSTRACT

A method of electrochemically polishing a metal body which comprises juxtaposing the surface to be polished with a tool electrode in the presence of an abrasive and an electrolyte, and applying pulses having a duration not exceeding 100 microseconds between the electrode and the workpiece with the electrode being poled negatively.

17 Claims, 11 Drawing Figures

FIG. 7A  A  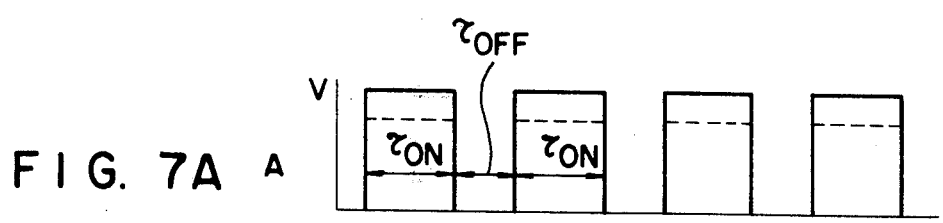
FIG. 7B  C  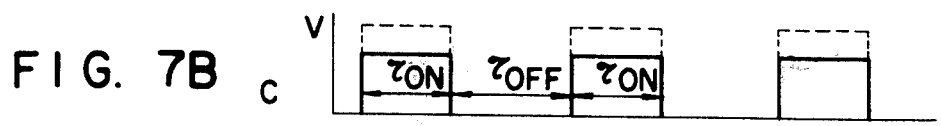
FIG. 7C  B  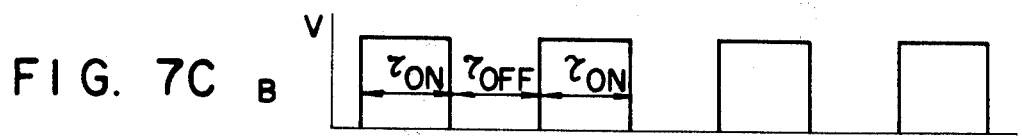

ELECTROCHEMICAL POLISHING METHOD

FIELD OF THE INVENTION

The present invention relates to electrochemical polishing method. More particularly, it concerns an improved power-supply method for a device for electrochemically polishing metallic and other electrically conductive surfaces.

BACKGROUND OF THE INVENTION

The electrochemical polishing device with which the invention is concerned may make use of a tool electrode comprising an electrically conductive body portion having electrically nonconductive minute projections provided uniformly on the working surface thereof. Such a tool electrode may typically be coupled detachably to a tool holder designed for hand-held or portable use of the device, the tool holder being in turn associated with an electrolyte supply unit which feeds a polishing electrolyte from a reservoir to the region of a workpiece surface to be polished through the interior of both the tool electrode and the holder which are in communication with one another. The tool electrode has one terminal connected to the negative terminal of a unidirectional current source whose positive side is led through a conductor to a terminal conductively attached to the workpiece so that material may electrolytically be removed from the workpiece surface confronting the tool electrode to polish the workpiece. In conventional electrochemical polishing systems of this type, the power supply used is commonly a direct-current or pulsating-current supply. While the use of shaped discrete pulses has been proposed and is known in the art of electrochemical machining as disclosed in U.S. Pat. No. 3,654,116, the duration of pulses used in the prior art is relatively long.

SUMMARY OF THE INVENTION

The present invention is based upon the discovery that improved electrochemical polishing efficiency is obtained when use is made of electric pulses of a pulse duration selected in a certain range. The invention is especially advantageous for a portable electrochemical polishing device in which the polishing operation is carried out with a hand-held tool electrode and hence the gap condition between the tool electrode and the workpiece is inherently not fixable.

In accordance with the present invention, there is provided a method of electrochemical polishing in which an electric current in the form of pulses is applied between a workpiece and a tool electrode juxtaposed therewith in the presence of an electrolyte to electrochemically polish the surface of the workpiece, the pulses having a pulse duration not greater than 100 microseconds.

The pulse duration or on-time should preferably range between 1 and 50 microseconds. The pulse off-time should preferably be more than two times longer than the pulse on-time.

The electrolyte is flushed through the polishing gap between the tool electrode and the workpiece to carry away material eroded from the workpiece.

Preferably, a pulse of the reverse polarity is supplied between the adjacent pulses of the normal polarity.

An apparatus for carrying out the method according to the invention may comprise a direct-current source, a switching unit for on/off controlling the output of the direct current source and a pulser for supplying switching control pulses to the switching unit. The direct-current source may preferably comprise a voltage-stabilizing regulator.

The apparatus preferably includes means for responding to an electrical parameter representative of the condition of the electrochemical polishing gap between the tool electrode and the workpiece. Such means may be a resistor connected in series with the gap and a voltage source to detect the magnitude of the electrochemical polishing current passing through the gap or a resistor connected in parallel with the electrochemical polishing gap to detect the voltage thereacross.

The electrical signal representative of the gap condition may be used to modify the basic switching control pulses in the manner to alter a parameter of the electrochemical current pulses, i.e., pulse on-time, off-time and/or amplitude, in accordance with the gap condition so that the electrochemical polishing operation may proceed under an optimum condition.

The electronic switch may thus include at its input or control electrodes gate means having two input terminal, one receiving basic switching control pulses fed from the pulser and the other receiving a control signal fed from the gap-condition detector means to apply modified pulses across the gap. Alternatively, the pulser may incorporate a plurality of time-constant networks determining the on-time and/or off-time of pulses and selectively actuatable in response to the gap-condition detecting means.

In accordance with a further aspect of the invention, the power supply may advantageously take the form of DC-AC-DC inverter circuitry comprising an input energized by a commercial alternating-current source, a rectifier for producing a direct-current output therefrom, a switching unit for on/off controlling the direct-current and a pulser associated therewith to produce a train of pulses of a regulated frequency, say, in a range of 10 to 50 kHz, a transformer for transforming the pulses into a alternating-current pulses and a rectifier for converting the alternating-current pulses into unidirectional pulses for application between the tool electrode and the workpiece. The alternating-current output may here advantageously be used also to energize a vibrating horn of an ultrasonic polishing tool so that the polishing operation may be carried out by a combination of electrolytic and ultrasonic machining actions. Furthermore, the rectified unidirectional pulses may be used for energization of electrodepositing electrodes so that the polishing of a workpiece may be performed before and/or after the electrodeposition thereof.

BRIEF DESCRIPTION OF THE DRAWING

The invention will now be described with reference to the accompanying drawing illustrating certain embodiments thereof and in which:

FIG. 7 is a schematic view illustrating waveform of pulses modified in accordance with a specific aspect of the invention.

SPECIFIC DESCRIPTION

Figure 1:
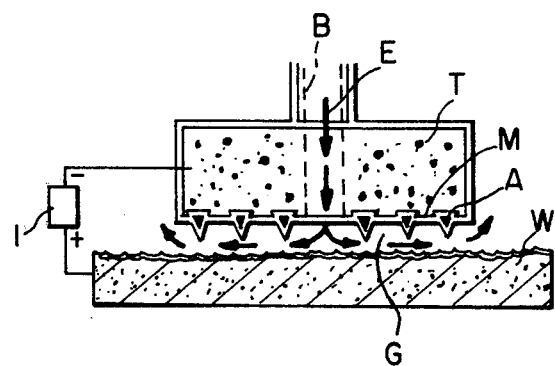
FIG. 1 is a cross-sectional view diagrammatically illustrating a tool electrode and a workpiece to be polished thereby in accordance with the invention.

Referring to FIG. 1, there is shown a tool electrode T which may be a porous abrasive body rendered electrically conductive by the deposition of a metal on the wall portions of the pores and having abrasive projections A uniformly provided on a working face M. As is well known in the art, the tool T may alternatively comprise a metallic body to which are embedded abrasive particles A or a mass of abrasive particles bonded together by a metal. The tool T is shown juxtaposed with a workpiece W to be polished and having an internal bore B which carries a liquid electrolyte E from a reservoir (not shown) into a polishing gap G in the direction of arrows, the used electrolyte being returned to the reservoir and recycled to the gap G after filtration. Shown also connected across the tool electrode T and the workpiece W is a power supply 1 for supplying a pulsed electrochemical polishing current in accordance with the present invention.

Figure 2:
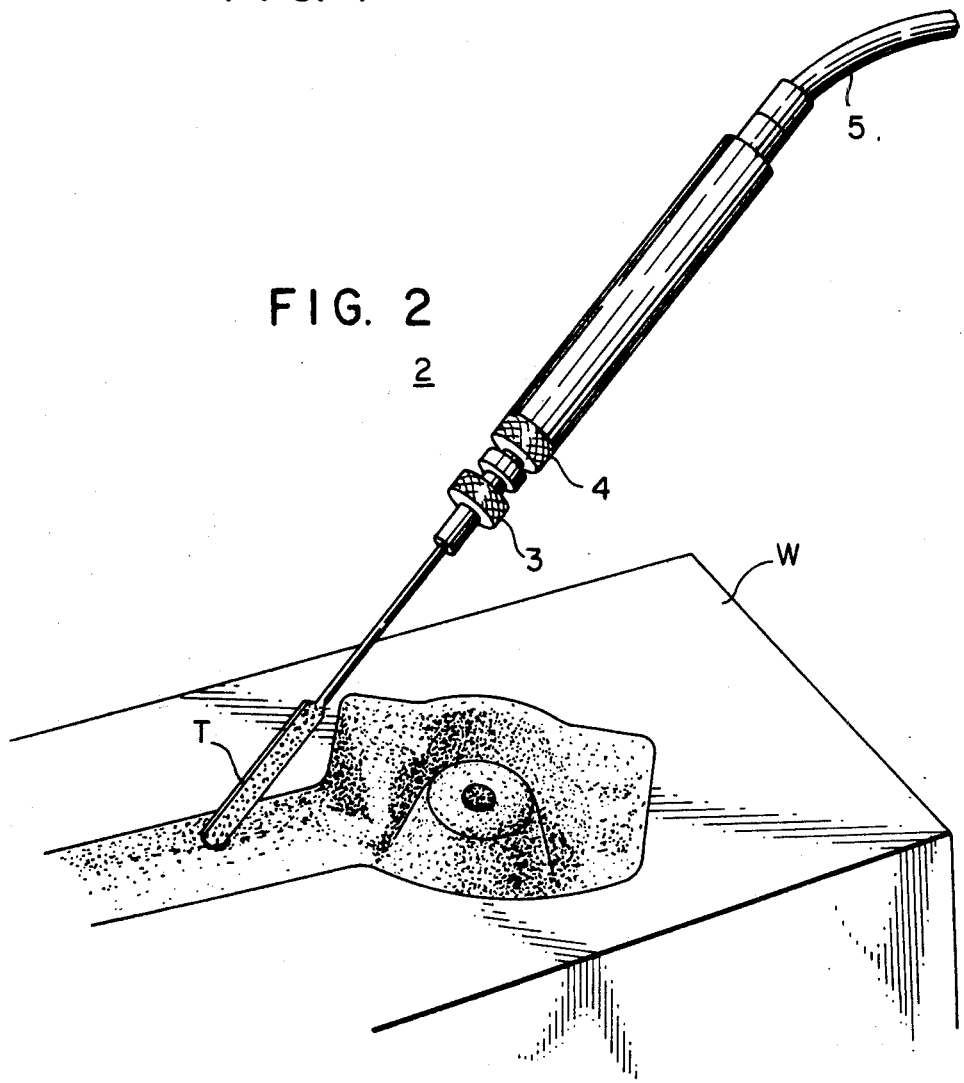
FIG. 2 is a pictorial view of an electrochemical polishing device with which the invention may be practiced.

In FIG. 2, the workpiece W is illustrated as being a diecasting die provided by electrical discharge machining with a cavity C to be finished by an electrochemical polishing tool 2 with a power supply 1 in accordance with the present invention. As shown, the tool 2 has the electrode T attached via a coupling 3 to a holder 4 having an insulating coating applied thereon. Although now shown, the tool T and the holder 4 are provided with fluid passages communicating with one another to feed the liquid electrolyte from the reservoir via an inlet tube 5 into the machining gap to flush it through the latter as shown in FIG. 1. The polishing device 2 may advantageously be used with a plurality of tools T of different shapes and sizes in accordance with particular configurations of locations to be polished on the workpiece W. The tool holder 4 has an electrical lead provided coaxially with the electrolyte supply tube 5 and connected to the negative terminal of the power supply 1. The positive terminal of the latter has a lead connectable to the workpiece W through, for example, a magnetic coupling (not shown). The electrolyte in the polishing region on the workpiece W is collected by a pump (not shown) for return to the reservoir.

Figure 3:
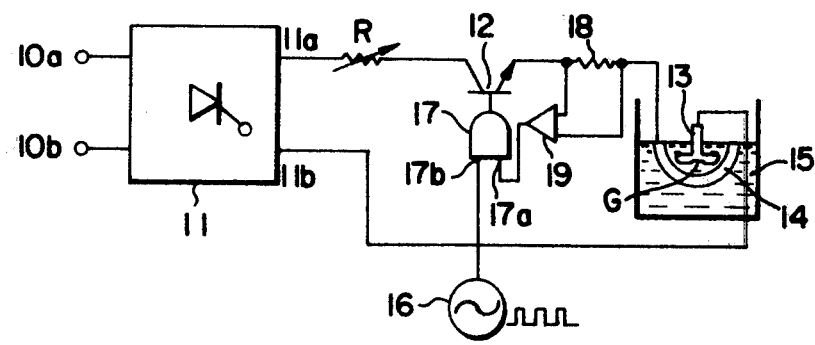
FIGS. 3 to 5 are circuit diagrams of different, preferred circuit assemblies for carrying out the method according to the invention.
Figure 4:
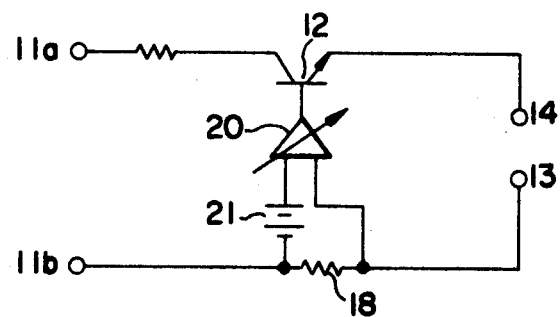
Figure 5:
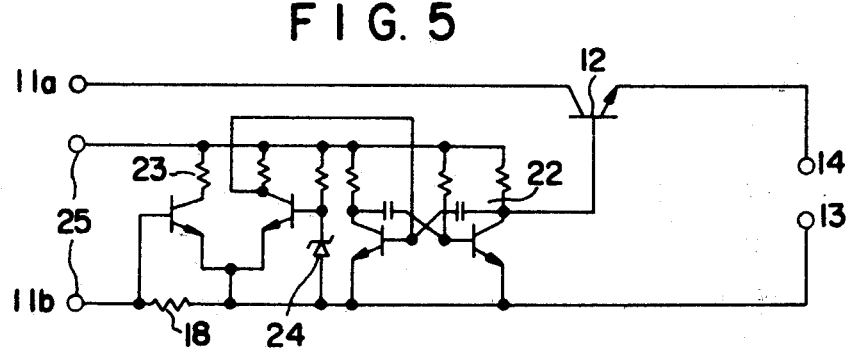

In FIGS. 3 to 5 there are shown several circuit arrangements adapted to carry out the method according to the invention and described hereinbefore.

The circuitry of FIG. 3 includes input terminals 10a and 10b fed from a commercial power source of an alternating current and a voltage regulator 11 adapted to provide across its output terminal the direct-current voltage or output of a constant amplitude. The voltage regulator 11 may be any of those known in the art and may be an arrangement described, for example, in U.S. Pat. No. 3,947,753 or in the U.S. patents cited therein as references.

Connected in series with the output terminals 11a and 11b of the voltage regulator 11 are a current limiting resistor R, a switch 12 which may be constituted by a transistor as shown, a thyristor or any other electronic switching element, and a polishing gap G formed by a tool electrode 13 and a workpiece 14 juxtaposed in a working pan 15 in the presence of a liquid electrolyte. To cause the electrolyte to forcibly flow in the region of the gap G, a pump (not shown) and conduits (not shown) for coupling it with the pan 15 may be provided.

The switch 12 is turned on and off by a pulser 16 which provides control pulses of a preset on-time and off-time in the ranges described hereinbefore to provide across the electrode 13 and the workpiece 14 the polishing current in the form of pulses basically of the corresponding on-time and off-time and of an amplitude adjusted by the resistor R.

In accordance with a specific aspect of this invention, the pulsed electrochemical polishing current is modified as a function of variation of the machining condition. Thus, the amplitude, on-time and/or off-time of electrolytic polishing pulses may be controlled as a function of the gap voltage, current and/or the impedance between the electrode 13 and the workpiece 14 subject to change in accordance with change in the electrochemical polishing condition.

The circuitry of FIG. 3 is designed to respond to the gap current and, to this end, is provided with a sensing resistor 18 inserted in series with the switch 12 and the electrochemical polishing gap G between the electrode 13 and the workpiece 14. The sensing resistor 18 has an amplifier 19 connected at its output. The output of the amplifier 19 is connected to the first input 17a of an AND gate 17 having the second input 17b which receives control pulses from the pulser 16. The amplifier 19 here has a function to discriminate the magnitude of the gap or electrochemical polishing current detected by the resistor 18 with respect to a preset value so that, for example, when the gap current exceeds this value, an "0" signal develops to be applied to the first input 17a to block the passage and application of control pulses from the pulser 16 to the switch 12 thereby reducing the frequency or the on/off time ratio of the pulses applied across the electrochemical polishing gap G. The result is the enhanced uniformity of the surface polished on the workpiece 14.

The circuitry of FIG. 4 makes use of a chopper amplifier 20 associated with a reference-voltage source 21 and a sensing resistor 18. The comparison of the reference voltage 21 with the voltage developed across the resistor 18 in response to the magnitude of the electrochemical polishing current passing between the electrode 13 and the workpiece 14 causes the amplifier 10 to controllingly turn on and off the switch 12 at variable on/off times as in the embodiment of FIG. 3. For the chopper amplifier, any of those known may be used; for example, Texas Instruments Regulating Pulse Width Modulators Types SG1524, SG2524, SG3524.

In the circuitry of FIG. 5, a multivibrator 22 of known construction is used as the pulser for applying basic switching control pulses to the switch 12. The basic switching control pulses and hence the electrochemical polishing current pulses determined thereby are modified as in the previous embodiments, here by a comparison network 23 which compares the reference voltage which develops across a Zener diode 24 with the voltage across the sensing resistor 8 responding to the magnitude of the electrochemical polishing current passing through the gap G.

Figure 6:
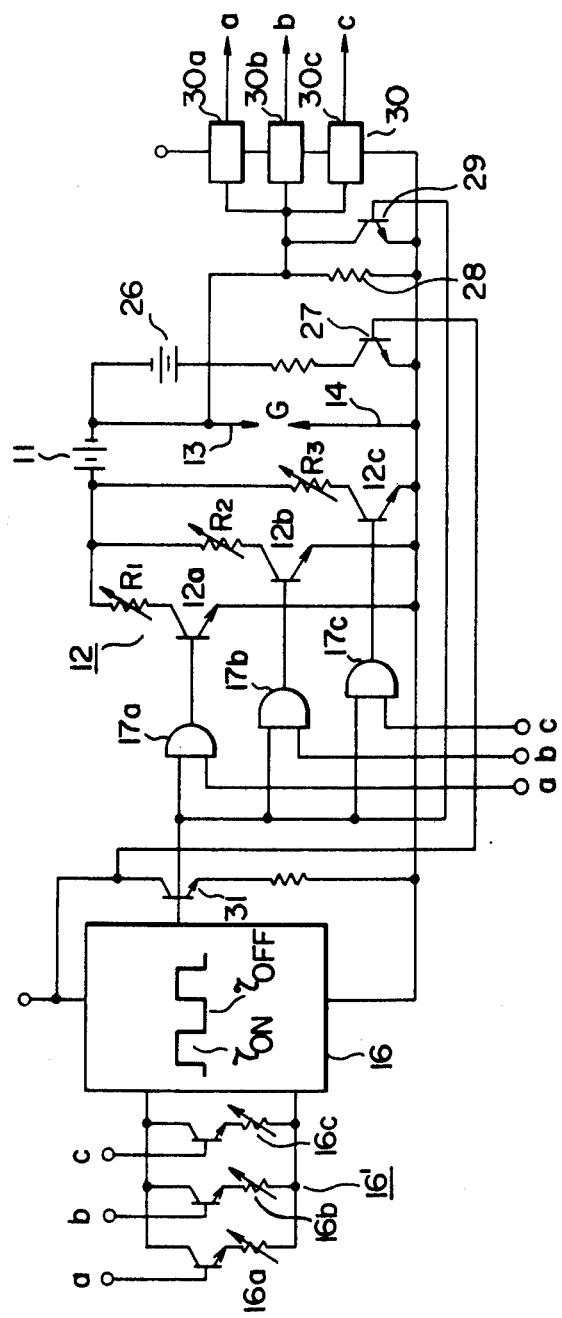
FIG. 6 is a circuit diagram of a further pulsing system embodying the present invention.

In FIG. 6 there is shown a different circuitry for carrying out the invention. In this circuit arrangement as well, the electrode 13 and the workpiece 14 forming an electrochemical polishing gap G therebetween are connected in series with an electronic switch 12, here shown by three transistors 12a, 12b and 12c, and a direct-current source 11. The switch 12 is turned on and off by a pulser 16 which may be a multivibrator having time-determining means 16' here constituted by three pairs of transistors and resistors 16a, 16b and 16c, connected in parallel with one another and selectively actuatable. The resistance of the resistors in these pairs is set at different values so that when the network 16a is switched on, the pulse off-time of the pulser 16 has a minimum value; when the network 16c is switched on, it has a maximum value; and when the network 16b is switched on, the same has a medium value.

At the output of the pulser 16 there are provided three gates 17a, 17b and 17c for applying it to the three switching transistors 12a, 12b and 12c, respectively. These gates have each an additional input terminal a, b, c and are each enabled when the corresponding input appears. The switches 12a, 12b and 12c are further associated, respectively, in series with resistors R1, R2 and R3 having different resistances which determine the magnitude of the current pulses applied to the gap.

In this embodiment, the series circuit of an auxiliary voltage source 26 and a transistor 27 is connected across the gap G. The transistor 27 is here designed to be turned on and off by the phase-reversed signals of the output pulses from the pulser 16 appearing across a phase-reversing transistor 31 so that the voltage from the auxiliary source 26 which serves as a test voltage develops across the gap during each off-time of electrochemical polishing current pulses. The resistance or impedance during the pulse off-time is thus selectively detected at a further resistor 28 which is shunted during pulse on-time by a further transistor 29 that is switched on by the on-pulse from the pulser 16. The detecting resistor 28 is connected a discriminator unit 30 consisting of three threshold circuits 30a, 30b and 30c which may be constituted by Schmitt-trigger circuits having /different threshold or triggering voltage levels $V30a > V30b > V30c$ and having output terminals a, b and c, respectively.

In operation, every time the polishing current is switched off, the switch 27 is turned on to permit the test voltage from the source 26 to be applied across the gap G while the switch 29 is turned off. A voltage proportional to the gap voltage then develops across the resistor 28 and is discriminated by the discriminator 30. Thus, when the gap is under a normal condition, a "1" signal will appear at the output b to turn on the switch 16b, thereby setting the pulse off-time at a predetermined, moderate value. At the same time, the "1" signal at the output b will selectively enable the gate 17b to permit the switch 12b alone to operate. The pulsed electrochemical polishing current will then flow which has a magnitude established by the resistor R2.

When the gap is under a high-impedance condition, a "1" signal will develop at the output a to actuate the setting channel 16a thereby setting the pulse off-time at a predetermined, decreased value established by this channel. The "1" signal at the output a will also selectively enable the gate 17a to permit the switch 12a alone to be switch-controlled. The pulsed electrochemical polishing current will then flow which has an increased magnitude established by the resistor R1. A series of pulses modified when the gap is under a high-impedance condition are shown at A in FIG. 7.

When the gap G is under a low-impedance condition, a "1" signal will develop at the output c to actuate the setting channel 16c thereby setting the pulse off-time at a predetermined, increased value established by this channel. Simultaneously, the "1" signal at the output c will act to selectively enable the gate 17c to permit the switch 12c alone to be triggered. The pulsed electrochemical polishing current will then flow which has a decreased magnitude established by the resistor R3. A series of pulses modified when the gap is under a low-impedance condition is represented at C in FIG. 7. The waveform B in the same FIGURE represents a series of pulses under a normal gap condition.

Electrochemical polishing of a steel workpiece was conducted using a pulsing circuit arrangement as described with reference to FIGS. 6 and 7 and excellent results were obtained, for instance, with a pulse on-time of 10 microseconds and a pulse off/on time ratio of 1/1 under a normal-impedance gap condition, an increased off/on time ratio of 5/1 under a low-impedance gap condition and a decreased off/on time ratio of 0.3/1 under a high-impedance gap condition.

Figure 8:
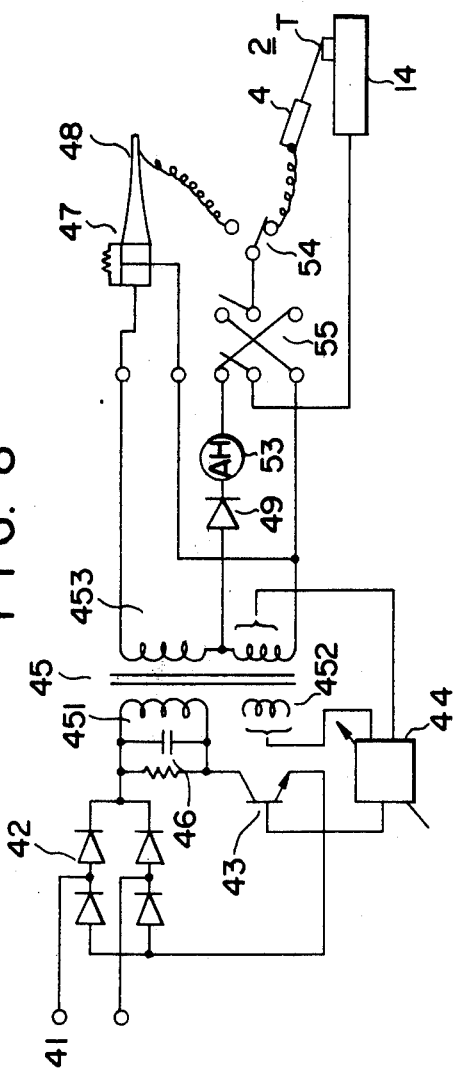
FIGS. 8 and 9 are circuit diagrams of still further pulsing systems embodying the invention.

In FIG. 8 there is shown another embodiment of the invention in which an input 41 from a commercial alternating-current source is fed through a full-wave rectifier 42 to produce a direct-current at the output terminals thereof. In series with the latter, there is provided an electronic switch 43, shown as a transistor, which is on/off controlled by a pulser or oscillator 44 of an adjustable frequency in the range between 10 and 50 kHz for pulsing the DC output at the adjusted frequency as in previous embodiments. In this arrangement, however, there is provided a transformer 45 which transforms the pulsed DC output into an AC output of the same frequency. Thus, the high-frequency AC output is produced through a capacitor 46 connected in parallel with a primary winding 451 of the transformer 45 in response to the on/off operation of the switch 43 and transformed by the transformer 45. The pulser 44 is here designed to be controlled in its oscillating operation by a winding 452 and an output winding 453 of the transformer 45 to provide an output of controlled frequency and voltage magnitude.

From the secondary winding 453 of the transformer 45 there is provided the high-frequency AC output here for direct use in energizing an ultrasonic vibrator 47 having an ultrasonic machining head 48 of conventional design adapted for ultrasonically polishing the surface of a workpiece 14 with the aid of abrasive particles bonded on the heaad 48 or supplied in suspension between the head 48 and the workpiece 14. On the other hand, the same output is fed through a rectifier 49 to provide high-frequency unidirectional pulses for use with the electrochemical polishing device 2 comprising the tool electrode T supported on the holder 4 as mentioned previously.

The system of FIG. 8 also includes a change-over switch 54 to allow an alternative or combined use of both the ultrasonic and electrochemical polishing arrangements and a second changeover switch 55 to allow the polarity reversal of the pulsed electric current, thus permitting the use of the system for pulse electrodepositing as well. Furthermore, an ammeter 53 is included in the electrochemical circuit section to enable the determination of the amount of material removal which will be proprrtional to the ampere and hour product as measured.

With the system of FIG. 8, the finishing of the workpiece 14 may be effected first with the ultrasonic polisher 48 and subsequently by the electrochemical polisher 2 or vice versa or by operating the two alternatively, possibly also combined with electrodepositing finishing operation through polarity reversal in the electrochemical circuit portion. The polishing fluid, electrolyte and depositing liquid may then be supplied through nozzles (not shown) provided in the respective units in the respective steps. With an electrode used having a sponge-like member, the latter may be impregnated with a polishing fluid in contact with the workpiece surface for supply to the polishing gap.

As noted above, the DC-AC-DC converter circuitry here employed is suitable for producing a pulsed or alternating current of a sufficiently high frequency, say, in the range of 10 to 50 kHz or of a sufficiently narrow pulse width not exceeding 100 microseconds and preferably between 1 and 50 microseconds as noted previously. Accordingly it also permits its output induced at the output winding of the transformer 45 to be used directly for a common operating power supply both for electrochemical and ultrasonic polishers. Furthermore, because of its high-frequency operating characteristics, the transformer 45 can be made compact, permitting the entire power supply unit to be built in a small size and light weight. Additionally it may be mentioned that a simple provision of a rectifier 49 in a branch in the output side of the transformer 45 makes available a multi-functional polishing unit with a unified, compact power supply equipment.

In the secondary winding of the transformer 45 there may, of course, be provided additionally a number of taps for voltage settings for selection and coils may be used insulated from the winding 453 for rectification or direct use.

Figure 9:
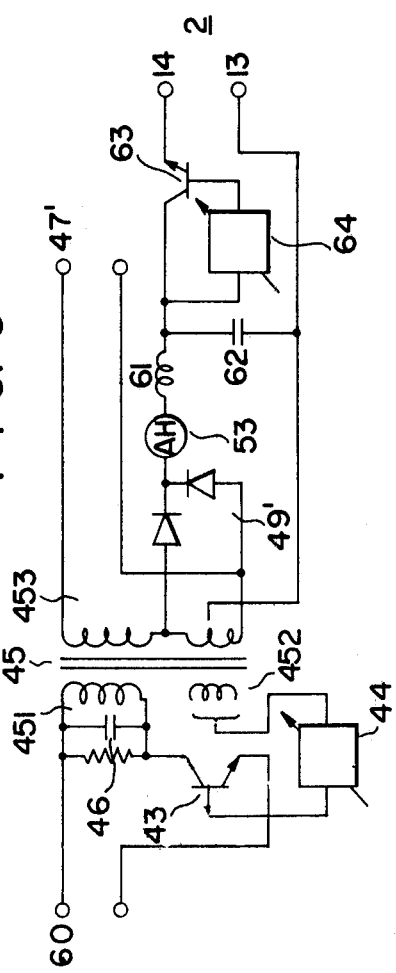

A modified circuit arrangement illustrated in FIG. 9 makes use of a transformer 45, a switch 43 and an oscillator or pulser 44 which are basically identical to the counterparts in the previous circuitry. As the terminals 60 there is developed a direct-current output which is produced by the rectifier unit 42 and is pulsed by the switch 43 in response to the operation of the oscillator 44 and at the secondary winding 453 of the transformer 45 there is developed a high-frequency AC output for the energization of an ultrasonic polisher 47' as in the previous embodiment. In the system of FIG. 9 the circuit portion for energization of an electrochemical polisher 2 is shown including a full-wave rectifier 49', an inductor 61 and a capacitor 62 which produce a smoothed DC output and in addition a switch 63, shown again as a transistor, which is on/off controlled by an oscillator or pulser 64 to supply to the electrochemical system 2 a succession of pulses of a frequency, pulse on-time and off-time adjusted at the pulser 64. As noted previously, the pulse duration or on-time is adjusted in accordance with the present invention in the range of 1 to 100 microsecond or not exceeding 50 microseconds and the off-time is similarly adjusted. By utilizing pulses of such widths, an improved finishing is obtainable at an increased current density thereby permitting an increased machining efficiency while assuring a high-quality and uniformly polished surface. Furthermore, finishing of an intricate surface is made possible with a satisfactory result and cut-off or modification of current parameters upon occurrence of short-circuiting or arcing at the machining gap is greatly facilitated.

We claim:

1. A method of electrochemical polishing in which an electric current in the form of pulses is applied between a workpiece and a tool electrode juxtaposed therewith in the presence of an electrolyte, the pulses having a pulse duration not greater than 100 microseconds.

2. The method according to claim 1 in which the pulse duration or on-time ranges between 1 and 50 microseconds.

3. The method according to claim 2 in which the pulse off-time or interval between adjacent pulses is more than two times longer than the pulse on-time.

4. The method according to claim 2 in which a reverse-polarity pulse is interposed between adjacent pulses of the normal polarity.

5. The method according to claim 2 in which at least one of parameters of pulses is modified in accordance with at least one of electrical parameters representative of the gap condition between the tool electrode and the workpiece.

6. The method according to claim 5 in which said at least one pulse parameter is pulse on-time, pulse off-time and pulse amplitude.

7. The method according to claim 6 in which said gap parameters are gap curent, gap voltage and gap impedance.

8. The method according to claim 2 in which the electrolyte is flushed in the region of electrochemical polishing.

9. A method of electrochemically polishing a surface of a metallic workpiece which comprises:
   closely juxtaposing an abrasive but electrically conductive tool electrode with said surface to form an electrochemical-polishing interface therebetween;
   forcing an electrolyte between said electrode and said workpiece;
   applying a series of polishing electric pulses across said electrode and said workpiece with said electrode being poled negative relative to said workpiece to electrochemically polish said surface; and
   controlling the pulse duration of said pulses to limit said pulse duration to a duration not greater than 100 microseconds.

10. The method defined in claim 9 wherein said duration is controlled to be between 1 and 50 microseconds.

11. The method defined in claim 10 which comprises providing the off-time between successive pulses with a duration more than twice the pulse duration.

12. The method defined in claim 11 wherein said workpiece is steel, said pulse duration is about 10 microseconds and the ratio of the pulse on-time to the pulse off-time is 5:1 to 0.3:1.

13. The method defined in claim 12 wherein said ratio is about 1:1.

14. The method defined in claim 9, further comprising applying a reverse polarity pulse between successive polishing pulses.

15. The method defined in claim 9 wherein said surface is an electrically machined surface of a die.

16. The method defined in claim 9, further comprising the step of superimposing on the electrochemical polishing an ultrasonic vibration of said electrode.

17. The method defined in claim 14 wherein said electrode is guided by hand along said surface.

* * * * *